United States Patent

Nakamura et al.

[11] 4,083,032
[45] Apr. 4, 1978

[54] SPEED-DECELERATION WARNING SYSTEM FOR MOTOR VEHICLES

[75] Inventors: Hiroyuki Nakamura, Gotenba; Hiroshi Kawaguchi; Kiyoshi Nishiwaki, both of Susono, all of Japan

[73] Assignee: Toyota Jidosha Kogyo Kabushiki Kaisha, Japan

[21] Appl. No.: 664,816

[22] Filed: Mar. 8, 1976

Related U.S. Application Data

[63] Continuation of Ser. No. 462,381, Apr. 19, 1974.

[30] Foreign Application Priority Data

Nov. 21, 1973  Japan .................................. 48-130931

[51] Int. Cl.² .......................... G08B 21/00; B60Q 1/26
[52] U.S. Cl. ......................................... 340/71; 340/69;
340/52 B; 340/52 C; 340/262; 200/61.45 R;
200/61.83
[58] Field of Search .................. 340/69, 71, 62, 52 B,
340/52 C, 52 H, 66, 262, 279; 200/61.45 R,
61.83, 82 D, 82 R, 61.48, 61.52

[56] References Cited

U.S. PATENT DOCUMENTS

| | | | |
|---|---|---|---|
| 3,380,046 | 4/1968 | Paonessa | 200/61.45 R |
| 3,440,603 | 4/1969 | Cochran | 340/66 |
| 3,528,056 | 9/1970 | Voevodsky | 340/72 |
| 3,548,124 | 12/1970 | Tollerud | 340/71 |
| 3,846,749 | 11/1974 | Curry | 340/262 |
| 3,939,316 | 2/1976 | Stropkay | 340/52 C |

FOREIGN PATENT DOCUMENTS 1,530,653  4/1969  Germany ........................ 340/52 B

*Primary Examiner*—John W. Caldwell, Sr.
*Assistant Examiner*—Donnie L. Crosland
*Attorney, Agent, or Firm*—Kenyon & Kenyon

[57] ABSTRACT

A speed-deceleration warning system for motor vehicles comprising pressured-oil supply means connected to a master cylinder of a brake mechanism, a hydraulic switch including a first contact moved by the action of pressured-oil, a speed-deceleration switch including a second contact moved by the influence of speed reduction of a vehicle and an electric circuit extending to a warning element through said first and second contacts. Such a device is applied for sending a warning to a driver if speed-deceleration of a vehicle does not reach an expected value although brake means are set on and hydraulic brake pressure rises over a prescribed value.

11 Claims, 4 Drawing Figures

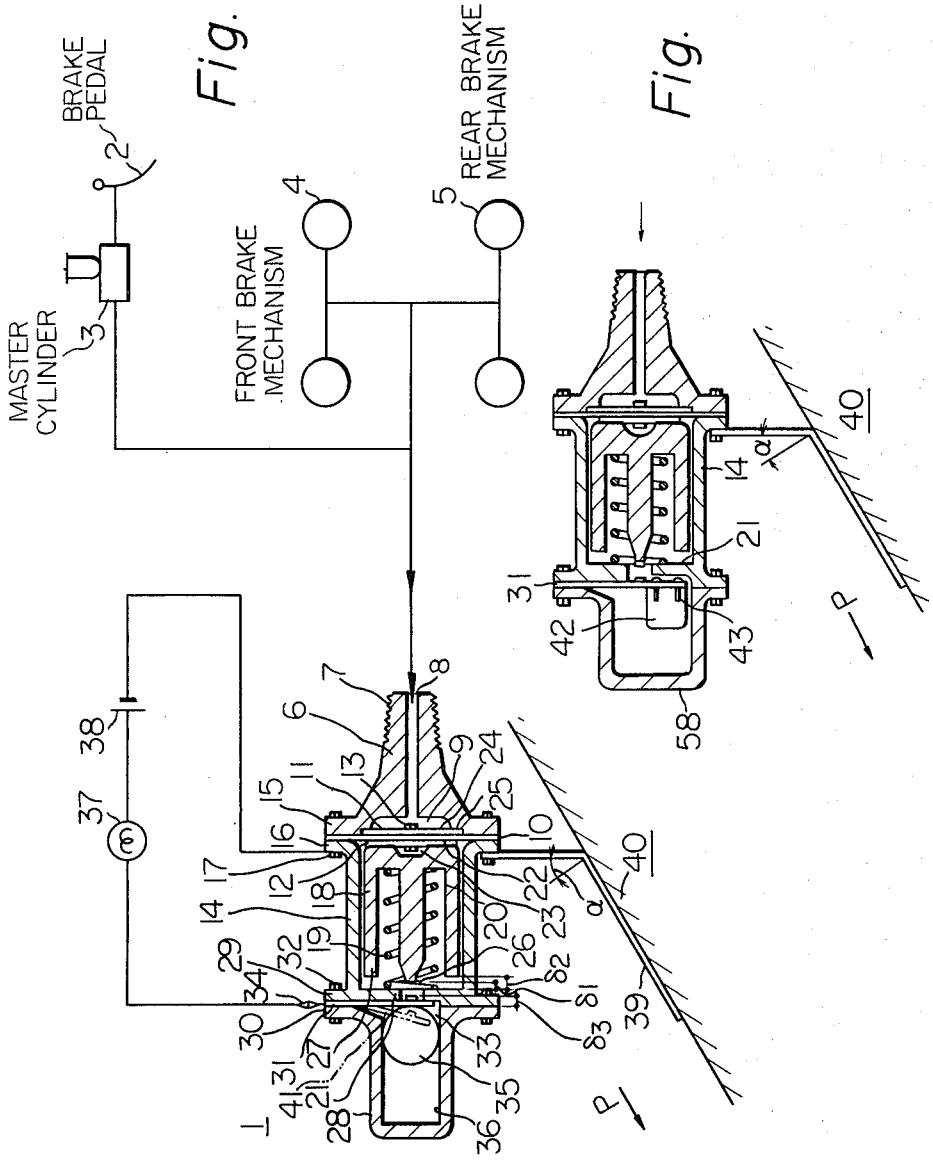

SPEED-DECELERATION WARNING SYSTEM FOR MOTOR VEHICLES

This is a continuation of application Ser. No. 462,381 filed Apr. 19, 1974.

BACKGROUND OF THE INVENTION

This invention relates to a speed-deceleration warning system for a motor vehicle, and more particularly to a system for sending a warning to a driver if speed-deceleration of a vehicle does not reach an expected value although brake means are set on and hydraulic brake pressure rises over a prescribed value.

These kinds of devices have not been conventionally known. It is conceivable, however, that such safety devices will be necessary in order to meet the requirements of traffic safety as car and truck traffic continue to increase. In the near future, it is possible that provision of such safety devices on vehicles will be required to meet government safety standards. In the future, if a hydraulic booster or other such devices are employed for the brake mechanism of a vehicle and the force on a brake pedal is greatly reduced, it will be difficult for the driver to perceive intuitively the relationship between the vehicle's speed-deceleration and the hydraulic brake pressure from said hydraulic booster. Used in the above instance, the safety devices of the present invention will attain their full usefulness. If speed-deceleration of a vehicle does not reach an expected value caused by the intervention of heat or water in the brake mechanism or other such reasons, although the brake pressure may rise over a prescribed value, it is still necessary to send a warning to the driver.

SUMMARY OF THE INVENTION

An object of this invention is to provide a system for sending a warning to the driver if speed-deceleration of a vehicle does not reach an expected value although hydraulic brake pressure rises over a prescribed value.

Another object of this invention is to provide a speed-deceleration warning system for a motor vehicle which applies the balance of the gravitational force of a ball or weight and the inertial force of said ball or weight. A further object of this invention is to provide a speed-deceleration warning system for a motor vehicle which applies the balance of an initial stress of a spring member and an inertial force of a weight.

A system according to this invention, which sends a warning to the driver if speed-deceleration of a vehicle does not reach an expected value although hydraulic brake pressure rises over a prescribed value, comprises pressured-oil supply means connected to a master cylinder of a brake mechanism, a hydraulic switch including a first contact moved by the action of pressured-oil, a speed-deceleration switch including a second contact moved by the influence of a vehicle's speed-deceleration, and an electric circuit extending to a warning element through said first and second contacts.

An aforesaid speed-deceleration switch can be advantageously constructed to move said second contact by the influence of the balance between the gravitational force of a ball or weight and the inertial force of said ball or weight, and also advantageously constructed to move said second contact by the influence of the balance between a predetermined initial stress of a spring member and an inertial force of a weight.

BRIEF DESCRIPTION OF THE DRAWINGS

In the drawings:

FIG. 1 is a cross-sectional view of a speed-deceleration warning system of a motor vehicle according to this invention and a diagram of an electric circuit is also shown;

FIG. 2 is a cross-sectional view of an alternative embodiment of a speed-deceleration warning switch according to this invention;

DESCRIPTION OF THE PREFERRED EMBODIMENTS

Figure 3:
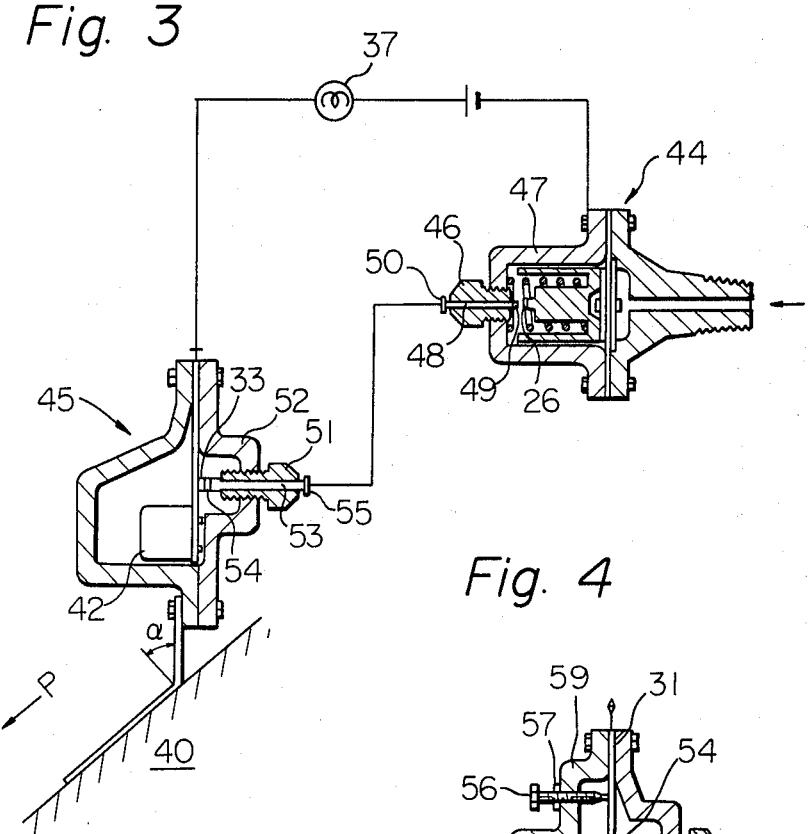
FIG. 3 is a cross-sectional view of a further alternative embodiment of a warning system according to this invention including a hydraulic switch and a speed-deceleration switch.

The following description of the preferred embodiments of this invention should aid in the understanding of its possible constructions and purpose.

Referring now to the drawings, there is disclosed in FIG. 1 a typical embodiment of a speed-deceleration warning system of vehicles according to this invention comprising a warning switch body 1, a brake pedal 2, a master cylinder 3, a front brake mechanism 4 and a rear brake mechanism 5.

Said warning switch body 1 consists of three parts 6, 14 and 28 connected to each other. The first part (body) 6, which has a substantially conical shape, is mounted directly on the master cylinder 3 or on a pipe connecting member (not shown) joined to the master cylinder 3 by means of the right end taper thread portion 7. An oil aperture 8 and an oil chamber 9 are provided within the body 6, which also has a diaphragm 10, a plate 11 and a plate 12. The plates 11 and 12 are arranged respectively at both sides of the diaphragm 10 and are secured on the diaphragm 10 by a screw or rivet 13.

The second part (body) 14 has a substantially cylindrical shape and is secured on the first part (body) 6 by means of a flange 15 of the first body 6 and a flange 16 of the second body 14, and a diaphragm 10 is disposed therebetween by bolts or rivets 16. In the body 14, there is provided a travelling member 18 which receives a movement of the diaphragm 10. There is also a compression coil spring 19 in the body 14, one end of which is exposed on a bottom wall of a hollow portion 20 of the travelling member 18, and the other end is supported on an inner flange 21 of the body 14. The travelling member 18 is always forced to the right (i.e. the direction toward the diaphragm 10), and the right end of the travelling member 18 contacts the left surface 23 of the plate 12. The diaphragm 10 and the plate 11 are also forced to the right, and the right surface 24 of the plate 11 touches an inner step portion 24 of the body 6. A pointed end of a center projected portion of the travelling member 18 is provided with an electric contact 26. The circumferential left end 27 of the travelling member 18 can contact the inner flange 21 of the body 14 so as to attain a stopper function in cooperation with the inner flange 21, when the diaphragm 10 is moved to the left by the hydraulic pressure so that the travelling member 18 is also moved to the left against the compression coil spring 19.

The third part (body) 28 is secured to the second part (body) 14 by means of an outer flange 29 of the body 14 and a flange 30 of the body 28, and a leaf spring 31 is disposed therebetween by bolts or rivets 32. The leaf spring 31 is made from a suitable electric conducting material, one portion of which is provided with an electric contact 33 and another portion of which is provided with an electric terminal 34. All surfaces of the leaf spring 31 are covered by suitable coating materials such as a resin coating, except for the portions of the electric contact 33 and the electric terminal 34, with the result that an electric current can not flow between the body 14, 28 or a ball 35 and the leaf spring 31. In the body 28 there is formed a hollow portion 36 in which said ball 35 can be moved. A lead line or wire, extending through a warning lamp or buzzer 37 and a battery 38 to form an electric circuit, is connected at one end to the electric terminal 34 and at the other end, to a bolt or rivet 17. The contact between the electric contact point 26 of the travelling member 18 and the electric contact point 33 of the leaf spring 31 causes the electric circuit which is formed from battery 38, lamp or buzzer 37, terminal 34, contact points 33 and 26, travelling member 18, compression coil spring 19, body 14 and bolt or screw 17, to close, so that the warning lamp or buzzer 37 is switched on.

In order to mount this warning switch body 1 on a portion of a vehicle body 40 a bracket 39 is provided which has a specific configuration so that this switch body 1 may be mounted at a predetermined angle with respect to the horizontal level. Consequently, the warning switch body 1 would be included at the predetermined angle ($\alpha$) from the horizontal level (the level shown by the bracket 39 in FIG. 1), and the leaf spring 31 is forced toward the flange 21 by the gravitational force of the ball 35. The leaf spring 31 is, however, designed to deflect to the left by its own elasticity, when the ball 35 does not force the leaf spring 31 toward the flange 21. To ensure this movement of the leaf spring 31 a notch portion within the body 28 is provided as shown in the drawing.

Functioning of this speed-deceleration warning system for a motor vehicle will now be described by way of the above described embodiment. Hydraulic pressure from a master cylinder 3 is introduced through an oil inlet aperture 8 into an oil chamber 9. The hydraulic pressure exerts itself onto a diaphragm 10 forming one of the walls of the oil chamber 9, so that the diaphragm 10 is compressed to the left. The diaphragm 10 then forces a travelling member 18 leftward and in this case, if the hydraulic pressure rises over its prescribed value, the travelling member will be moved leftward against a compression coil spring 19 which always forces the travelling member 18 to the right. Consequently, an electric contact point 26 provided at the left end of the travelling member 18 is also moved leftward, so that when the leaf spring 31 is forced leftward by the ball 35, the contact point 26 touches the electric contact point 33 provided on the leaf spring 31 and an electric current flows in the circuit including the lamp or buzzer 37 and the battery 38.

However, when brake pedal 2 is depressed by the driver and the hydraulic pressure in the master cylinder 3 rises, a front brake mechanism 4 and a rear brake mechanism 5 operated by the hydraulic pressure are activated and the speed of the vehicle, travelling in the direction of arrow P, is reduced. Because a warning switch body 1 is mounted on a portion 40 of the vehicle body at a predetermined angle inclined down and rightward with respect to the horizontal level, the ball 35 forces the leaf spring 31 to the right by gravitational force. If deceleration of the vehicle reaches a predetermined value, the combination of the inertial force of the ball 35 tending to move itself leftward and the spring force of the leaf spring 31 becomes larger than the force exerted by the gravitational force of the ball 35 to move the leaf spring 31 to the right, so that the ball 35 will start to move leftward. Thus, because the leaf spring 31 is designed to deflect leftward by its own elasticity when the ball 35 is not forcing the leaf spring 31 to the right, the electric contact point 26 does not touch the electric contact point 33 and a current does not flow in the electric circuit, even though the travelling member 18, as well as the electric contact point 26, are moved leftward.

As described above, the electric contact point 26 moves leftward when the brake pedal is depressed by the driver and the hydraulic pressure in the master cylinder 3 rises over its prescribed value, while at the same time, the electric contact point 33 also moves leftward when the brake mechanism 4 and 5 are activated by said hydraulic pressure and the speed-deceleration of the vehicle reaches an expected value. However, when the speed-deceleration of the vehicle does not reach an expected value, although the hydraulic pressure in the master cylinder 3 rises over its prescribed value by the operation of the brake pedal 2, the electric contact point 33 keeps its primary position irrespective of the leftward movement of the electric contact point 26, so that the electric contact points 26 and 33 contact together and a current flows in an electric circuit so as to switch on a warning lamp or buzzer 37. Conversely, when the speed-deceleration of the vehicle reaches an expected value before the hydraulic pressure in the master cylinder 3 rises over its prescribed value by operation of the brake pedal 2, the electric contact points 26 and 33 do not come in contact because the electric contact point 33 has already moved leftward and a current does not flow in the electric circuit for switching on the warning lamp or buzzer 37, even though the hydraulic pressure thereafter may reach a prescribed value to move the electric contact point 26 leftward. On the assumption that clearance of the contact points is $\delta_1$ when a braking force is not exerted on the vehicle (i.e. in the shown position), the stroke of the travelling member 18 is $\delta_2$ and displacement of the contact point 33 defined by the action of the leaf spring 31 and the ball 35 is $\delta_3$. The given relationship is $\delta_1 < \delta_2 < (\delta_1 + \delta_3)$. Therefore, when travelling member 18 is in the left position, the head 27 maintains contact with the inner flange 21 of the body 14 and the electric contact point 26 cannot contact the electric contact point 33 which has moved to the left.

FIG. 2 is a view of an alternative embodiment of a speed-deceleration warning switch of this invention similar to FIG. 1, except for securing, in principle, ball 35 on the leaf spring 31. It will be sufficient to describe only those portions differing from the embodiment of FIG. 1. Within a body 58, there is provided a weight 42, which acts as an inertial mass when braking force is applied to the vehicle and is secured to the end of a leaf spring 31 by fastening means such as screws 43. The weight 42 forces the leaf spring 31 to the right by gravitational force and the head portions of the screws 43 come into contact with the inner flange 21 of the body 14 in order to keep the leaf spring 31 in the position shown in FIG. 2. It is to be understood that the arrangements, constructions and actions of the other portions of this embodiment are substantially identical to the above description and illustration of FIG. 1.

FIG. 3 is a view of another embodiment of a speed-deceleration warning system of vehicles of this invention similar to FIG. 2, except for separating the warning switch into two independent parts, one a hydraulic switch 44 and the other, a speed-deceleration switch 45. It will be sufficient to describe only those portions differing from the embodiment of FIG. 2. The hydraulic switch 44 includes a plug 46 which is made of suitable electric insulating materials such as resins and is engaged in a threaded opening formed at the left end of a body 47. Passing through the center of this plug 46 is a lead wire 48, which forms an electric terminal 49 at the right end and an electric terminal 50 at the left end. The speed-deceleration switch 45 also includes a plug 51 which is made of suitable electric insulating materials such as resins and is engaged in a treaded opening formed at the right end of a body 52. Passing through the center of this plug 51 is a lead wire 53, which has an electric contact point 54 at the left end and an electric terminal 55 at the right end.

The electric contact points 26 and 49 in the hydraulic switch 44 are kept in an opened position when the hydraulic pressure from a master cylinder (not shown in FIG. 3) does not reach a prescribed value. At the same time the electric contact points 33 and 54 in the speed-deceleration switch 45 are kept in a closed position when the speed-deceleration of the vehicle does not reach an expected value in order to move the weight 42 to the left. However, if speed-deceleration of the vehicle does not reach an expected value even though the hydraulic pressure of the master cylinder rises over a prescribed value by the operation of the brake pedal 2, the electric contact point 26 of the hydraulic switch 44 moves leftward to come into contact with the electric contact point 49, so that a current flows in the electric circuit to switch on a warning lamp or buzzer 37. If the speed-deceleration of the vehicle reaches an expected value before the hydraulic pressure in the master cylinder 3 rises over a prescribed value by the operation of the brake pedal 2, the warning lamp or buzzer 37 is not switched on, because electric contact points 33 and 54 of the speed-deceleration switch 45 are already in an opened position, even though the hydraulic pressure thereafter may reach a prescribed value so as to close the gap between the electric contact points 26 and 45. It is to be understood that the actions of this embodiment of a speed-deceleration warning switch of vehicles are substantially identical to that of embodiments shown in FIGS. 1 and 2.

Figure 4:
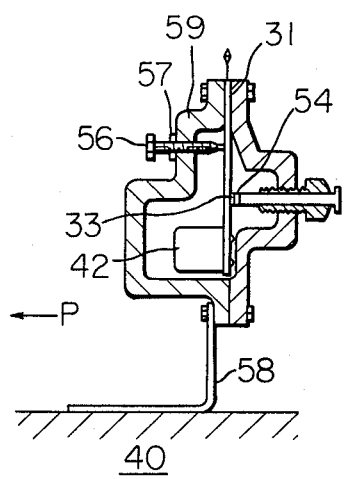
FIG. 4 is a cross-sectional view of an alternative embodiment of the speed-deceleration switch shown in FIG. 3.

FIG. 4 is a partial view of yet another embodiment of a speed-deceleration warning switch of vehicles of this invention similar to FIG. 3 except for changing, in principle, the construction of the speed-deceleration switch. It will be sufficient to describe only those portions differing from the embodiment of the above described speed-deceleration switch 45 in FIG. 3. Within a body 59, there is provided an adjusting screw 56 which can press and deform a leaf spring 31 so as to adjust the initial stress in proportion to its deformation. In the above described embodiments of FIGS. 1 through 3, a warning switch body and speed-deceleration switch are mounted at a predetermined angle from the horizontal level, therefore, the meeting of contact points depends on the balance between the gravity of a ball or weight and the inertial force resulting from speed reduction of a vehicle. In this embodiment, however, a speed-deceleration switch is mounted on the vehicle body 40 by means of a bracket 58, without inclination from the horizontal level, therefore the meeting of contact points depends on the balance between the initial stress of the leaf spring 31 and the inertial force of a weight 42. When the inertial force of the weight 42, which depends on the speed reduction of the vehicle resulting from the braking operation, rises over the initial stress of the leaf spring 31 adjusted to a predetermined value by the adjusting screw 56, electric contact point 33 mounted on the leaf spring 31 moves leftward so as to create an opening between the contact points 33 and 54. It will be understood that the arrangements and functions are substantially identical to the above described embodiments in FIGS. 1 through 3, except for providing a leaf spring, the initial stress of which can be adjusted by an adjusting screw 56.

From the above detailed explanations of the embodiments according to the invention, it can be seen that when the speed-deceleration of a vehicle does not reach an expected value even though the hydraulic pressure rises over a prescribed value by the operation of a brake pedal, a warning lamp or buzzer is switched on so as to send a warning to the driver. This kind of speed-deceleration warning system with relatively simple construction provided in a vehicle will lead to safer driving, since the driver is made aware of the braking force exerted on the vehicle and speed reducing conditions by means of the warning elements, such as a lamp or buzzer.

What is claimed is:

1. A braking deceleration warning system for a motor vehicle having braking means actuated by fluid under pressure, the warning system comprising:
   means for sensing a predetermined braking fluid pressure;
   means for sensing a predetermined deceleration of the motor vehicle resulting from the application of said predetermined braking fluid pressure;
   a device for warning an operator of the vehicle of abnormal vehicle deceleration when the brakes are applied; and
   means responsive to the braking fluid pressure sensing means and to the vehicle deceleration sensing means for actuating the warning device if, and only if, the applied pressure of the braking fluid at least equals said predetermined pressure that is normally effective to produce said predetermined deceleration of the vehicle, and the resulting deceleration is less than a predetermined normal rate of speed decrease corresponding to the applied braking fluid pressure.

2. A braking deceleration warning system for installation in a motor vehicle having a source of electrical power and braking means actuated by fluid under pressure, the warning system comprising:
   an electrically actuated device adapted to warn an operator of the vehicle of abnormal vehicle deceleration when the brakes are applied;
   a first electrical contact;
   a second electrical contact that is normally spaced out of electrical connection with the first contact;
   means adapted to connect the first and second contacts in circuit with a source of electrical power and the warning device for actuating the warning device only in the event that the first contact makes electrical connection with the second contact;

means connected to the first contact and adapted to be connected to the braking fluid system of a motor vehicle, said means being responsive to the pressure of the braking fluid for moving the first contact from a first position to a second position as the fluid pressure increases to above a predetermined pressure normally effective to produce a predetermined deceleration of the vehicle, the first contact being unable to make electrical connection with the second contact unless the first contact reaches at least said second position; and means responsive to deceleration of the vehicle for moving the second contact away from an initial position if the resulting vehicle deceleration attains at least the predetermined deceleration corresponding to said predetermined braking fluid pressure, the second position of the first contact being electrically connected with the initial position of the second contact, such that the first contact will make electrical connection with the second contact if, and only if, the applied braking fluid pressure at least equals said predetermined normal pressure, and the resulting vehicle deceleration is less than a predetermined normal rate of speed reduction corresponding to the predetermined braking fluid pressure.

3. A warning system according to claim 2 wherein the second position of the first contact coincides with the initial position of the second contact, and the means responsive to deceleration of the vehicle for moving the second contact away from said initial position comprises:

a housing;

a member for supporting the second contact in the housing for movement toward and away from said initial position;

an inertia member in the housing contiguous to the second contact support member and constrained for movement along a linear path extending generally in the direction of movement of the second contact on the supporting member; and means for mounting the housing in the vehicle so that the path of movement of the inertia member is generally aligned with the normal direction of vehicle movement and is inclined with respect to the horizontal, the angle of inclination being such that downward gravitational force on the inertia member holds the second contact in the initial position until overcome by a forward inertia force at least equal to that developed by the predetermined minimum normal rate of speed reduction corresponding to said predetermined minimum braking fluid pressure.

4. The warning system of claim 3 wherein the second contact supporting member is a leaf spring attached to the housing at one end and having the second contact spaced from said one end.

5. The warning system of claim 4 wherein said leaf spring is biased to hold the second contact away from the initial position.

6. The warning system of claim 5 wherein the inertia member is a ball loosely positioned in front of the second contact supporting member when the housing is mounted in the vehicle, and the path of ball movement in the forward direction is inclined upwardly with respect to the horizontal, the angle of inclination being sufficient for the weight of the ball to overcome the bias force of the leaf spring.

7. A braking deceleration warning system for installation in a motor vehicle having a source of electric power and fluid pressure actuated braking means, the warning system comprising:

an electrically actuated device for warning a vehicle operator of abnormal deceleration of the vehicle when the braking means are actuated;

a warning switch body;

a first electrical contact mounted in the switch body for movement between a first position and a second position spaced a first predetermined distance from the first position;

a second electrical contact mounted in the switch body for movement between an initial position, located on the line between the first and second positions of the first contact and spaced a second predetermined distance from the first position less than said first predetermined distance, and a final position, spaced from the first position of the first contact by a distance from the first position greater than said first predetermined distance;

means responsive to braking fluid pressure for moving the first contact from its first position past the initial position of the second contact toward the second position in proportion as the fluid pressure increases past a corresponding predetermined minimum pressure required to actuate the braking means of the vehicle;

means responsive to vehicle deceleration for moving the second contact from the initial position to the final position in proportion to the rate of speed reduction increase, the movement of the first contact from its first position as a function of braking fluid pressure being less than the sum of said second predetermined distance and the movement of the second contact from its initial position as a function of the resulting vehicle deceleration so long as the rate of speed reduction remains above a predetermined minimum normal rate corresponding to the braking fluid pressure; and means for connecting the first and second contacts in series with the source of electric power and the warning device for actuating the warning device only if the braking fluid pressure exceeds the predetermined minimum pressure for actuating the braking means and the rate of speed reductions is below a predetermined minimum normal rate corresponding to the braking fluid pressure.

8. The warning system of claim 2 comprising:

a third electrical contact fixedly located at said second position to make conductive connection with the first electrical contact when the braking fluid pressure is at least equal to said predetermined pressure;

a first housing enclosing the first and third electrical contacts;

a fourth electrical contact fixedly located at said initial position to make conductive connection with the second electrical contact unless the vehicle deceleration is at least equal to said predetermined normal rate of speed reduction;

a second housing, separate from the first housing, enclosing the second and fourth electrical contacts; and means between the first and second housings for conductively connecting the third electrical contact to the fourth electrical contact.

9. The warning system of claim 8 wherein the means responsive to vehicle deceleration comprises
an inertia member mounted on the second housing and constrained to move in a predetermined path and
means for causing said electrical contact to follow the movement of said inertia member, said warning system further comprising:
a bracket attached to the second housing and adapted to mount said second housing in a vehicle so that the path of movement of the inertia member is aligned with the normal direction of vehicle movement and is inclined at a predetermined angle with the horizontal such that the force of gravity acts on the inertia member to tend to maintain the second electrical contact in said initial position, and deceleration of the vehicle acts on the inertia member to tend to move the second electrical contact away from said initial position.

10. The warning system of claim 2 wherein the means responsive to deceleration of the vehicle for moving the second contact away from said initial position comprises:
a housing;
a spring member positioned in the housing for providing a predetermined initial biasing force between the housing and the second electrical contact when said second contact is in said initial position; and
a weight mounted in the housing in contact with the spring member for movement in a predetermined path such that inertia forces acting on the weight as a result of vehicle deceleration will tend to move the second electrical contact away from said second position.

11. The warning system of claim 10 wherein said weight is secured to a portion of said spring member.

* * * * *